United States Patent
Lee

(10) Patent No.: US 11,496,295 B2
(45) Date of Patent: Nov. 8, 2022

(54) NON-TRANSITORY COMPUTER-READABLE MEDIUM STORING PROGRAM CODE, DECRYPTION DEVICE, AND COMMUNICATION SYSTEM INCLUDING ENCRYPTION DEVICE AND DECRYPTION DEVICE

(71) Applicant: Samsung Electronics Co., Ltd., Suwon-si (KR)

(72) Inventor: Jeehyoung Lee, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 157 days.

(21) Appl. No.: 16/990,073

(22) Filed: Aug. 11, 2020

(65) Prior Publication Data

US 2021/0194680 A1    Jun. 24, 2021

(30) Foreign Application Priority Data

Dec. 23, 2019 (KR) .................. 10-2019-0172720

(51) Int. Cl.
| | | |
|---|---|---|
| *H04L 9/00* | (2022.01) | |
| *H04L 9/06* | (2006.01) | |
| *H04L 9/08* | (2006.01) | |
| *H04L 9/32* | (2006.01) | |

(52) U.S. Cl.
CPC .......... *H04L 9/0825* (2013.01); *H04L 9/0618* (2013.01); *H04L 9/0861* (2013.01); *H04L 9/3242* (2013.01)

(58) Field of Classification Search
CPC ... H04L 9/0825; H04L 9/0618; H04L 9/0861; H04L 9/3242
See application file for complete search history.

(56) References Cited

U.S. PATENT DOCUMENTS

| | | | |
|---|---|---|---|
| 9,083,526 B2 | 7/2015 | Gentry | |
| 9,306,738 B2 | 4/2016 | Loftus et al. | |
| 2013/0170640 A1* | 7/2013 | Gentry | H04L 9/008 380/30 |
| 2014/0348106 A1* | 11/2014 | Bao | H04B 7/0663 370/329 |
| 2018/0323973 A1* | 11/2018 | Soukharev | G06F 7/725 |

(Continued)

FOREIGN PATENT DOCUMENTS

| | | | |
|---|---|---|---|
| CN | 110309674 A | * 10/2019 | ........... G06F 21/602 |
| KR | 101965628 B1 | 4/2019 | |
| KR | 10-2019-0081259 A | 7/2019 | |

OTHER PUBLICATIONS

Michael Naehrig, et al. "Homomorphic Encryption from Ring Learning with Errors", MSR Cambridge, dated Jan. 10, 2012.

*Primary Examiner* — Darshan I. Dhruv
(74) *Attorney, Agent, or Firm* — Harness, Dickey & Pierce, P.L.C.

(57) ABSTRACT

Provided is a non-transitory computer readable medium. The non-transitory computer readable medium storing program code that, when is executed by a processor, causes the processor to calculate a message, based on a first cipher text, a second cipher text, and a private key, to compare a coefficient of the message with a reference value based on a prime number, to decide a coefficient of a modified message, based on a comparison result between the coefficient of the message and the reference value, and to decrypt the modified message.

20 Claims, 12 Drawing Sheets

(56) References Cited

U.S. PATENT DOCUMENTS

| | | |
|---|---|---|
| 2018/0367294 A1* | 12/2018 | Hu ..................... G06F 21/6227 |
| 2018/0375640 A1 | 12/2018 | Laine et al. |
| 2019/0007197 A1 | 1/2019 | Laine et al. |
| 2019/0044720 A1 | 2/2019 | Poeppelmann |
| 2020/0195426 A1* | 6/2020 | Dreasher ............... H04L 9/0838 |
| 2020/0274709 A1* | 8/2020 | Cheon .................. H04L 9/0894 |
| 2020/0344050 A1* | 10/2020 | Anshel ................. H04L 9/0838 |
| 2021/0160222 A1* | 5/2021 | Bartolucci .......... H04L 63/0281 |

* cited by examiner

NON-TRANSITORY COMPUTER-READABLE MEDIUM STORING PROGRAM CODE, DECRYPTION DEVICE, AND COMMUNICATION SYSTEM INCLUDING ENCRYPTION DEVICE AND DECRYPTION DEVICE

CROSS-REFERENCE TO RELATED APPLICATIONS

This U.S. non-provisional patent application claims priority under 35 U.S.C. § 119 of Korean Patent Application No. 10-2019-0172720, filed on Dec. 23, 2019, the entire contents of which are hereby incorporated by reference.

BACKGROUND

Example embodiments of the inventive concepts relate to a non-transitory computer readable medium storing program code, a decryption device, and/or a communication system including an encryption device and a decryption device.

Public key encryption algorithms such as RSA (Rivest, Shamir, Adleman) algorithms are based on a difficulty of factorization or discrete logarithm problems. However, due to a Shor algorithm using a quantum computer that performs quantum calculations, the security of the public key encryption algorithms may be compromised due to the computing power of the quantum computer. The National Institute of Standards and Technology (NIST) standardizes the public key encryption algorithms that are secure in quantum computing environments, however, such post-quantum cryptography may have weaknesses.

SUMMARY

Example embodiments of the inventive concepts provide a non-transitory computer readable medium storing program code, a decryption device, and/or a communication system including an encryption device and a decryption device.

According to some example embodiments, a non-transitory computer readable medium storing program code that, when is executed by a processor, causes the processor to calculate a message, based on a first cipher text, a second cipher text, and a private key; compare coefficients of the message with a reference value to generate a comparison result, the reference value being based on a prime number; generate, based on the message, a modified message by selectively modifying the coefficients of the message based on the comparison result; and decrypt the modified message.

According to some example embodiments, a decryption device includes processing circuitry configured to, calculate a message based on a first cipher text, a second cipher text, and a private key, compare coefficients of the message with a reference value to generate a comparison result, the reference value being based on a prime number, generate, based on the message, a modified message by selectively modifying the coefficients based on the comparison result, and decrypt the modified message.

According to some example embodiments, a communication system includes an encryption device and a decryption device. The encryption device may be configured to, calculate a first cipher text based on a first public key, and calculate a second cipher text based on a second public key and a plain text message. The decryption device may be configured to, sample a private key based on a first normal distribution, sample the first public key from a polynomial ring, calculate the second public key based on the private key and the first public key, receive the first cipher text and the second cipher text from the encryption device in response to transmitting the first public key and the second public key thereto, generate a transmission message based on the first cipher text, the second cipher text, and the private key, compare coefficients of the transmission message with a reference value to generate a comparison result, the reference value being based on a prime number, generate, based on the transmission message, a modified transmission message by selectively modifying the coefficients of the transmission message based on the comparison result, and decrypt the modified transmission message.

BRIEF DESCRIPTION OF THE DRAWINGS

The above and other objects and features of the inventive concepts will become apparent by describing in detail some example embodiments thereof with reference to the accompanying drawings.

DETAILED DESCRIPTION

Hereinafter, some example embodiments of the inventive concepts will be described clearly and in detail such that those skilled in the art may easily carry out the inventive concepts.

Figure 1:
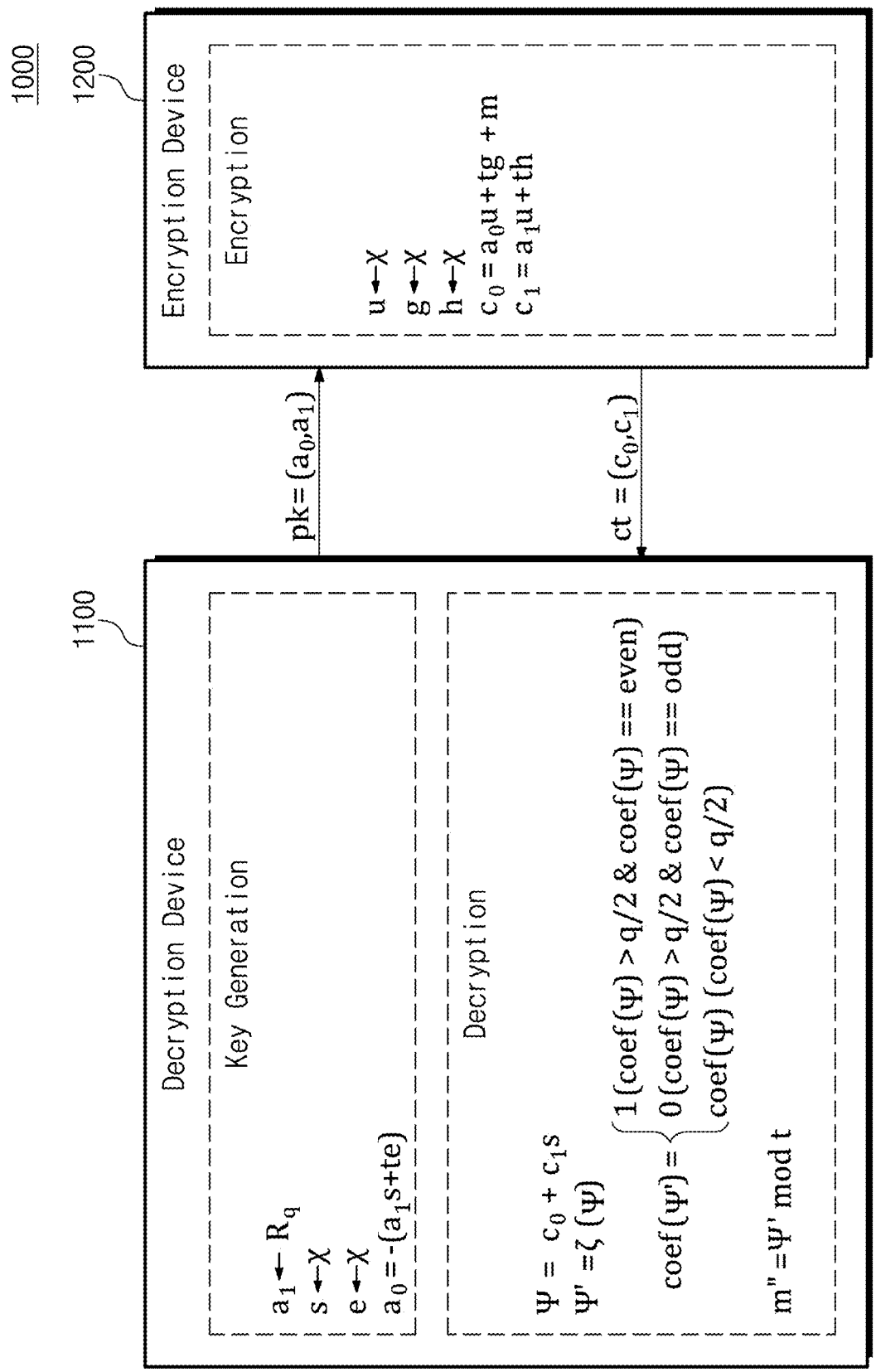
FIG. 1 is a block diagram of a communication system according to some example embodiments of the inventive concepts.

FIG. 1 is a block diagram of a communication system according to some example embodiments of the inventive concepts.

Referring to FIG. 1, a communication system 1000 may include a decryption device 1100 and an encryption device 1200. The decryption device 1100 and the encryption device 1200 may communicate with each other, based on an encryption algorithm according to some example embodiments of the inventive concepts.

The encryption algorithm used in the communication system 1000 may be based on a public key encryption algorithm. The public key encryption algorithm may be an asymmetric encryption algorithm that uses a public key for an encryption and uses a private (e.g., secret) key for a decryption, without using the same key for the encryption and the decryption.

The communication system 1000 according to some example embodiments of the inventive concepts may use a ring learning with errors (RLWE) encryption algorithm that is a type of a grid-based learning with errors (LWE) encryption algorithm, as post quantum cryptography that ensures security even in a quantum computer environment. The RLWE encryption algorithm not only may provide improved security, but also may support a homomorphic encryption capable of search or analysis of data. The homomorphic encryption is an encryption technique that may execute operation on encrypted data without the decryption. An operation result may be generated when an operation is executed on the data, and a first result may be generated when a subsequent operation result is encrypted. When the same operation is performed on the encrypted data, a second result may be generated. Based on the homomorphic encryption, the first result may be the same as the second result. Likewise, a third result may be generated when an operation is performed on data. An operation result may be generated when the same operation is performed on encrypted data, and a fourth result may be generated when a subsequent operation result is decrypted. Based on the homomorphic encryption, the third result may be the same as the fourth result.

The RLWE encryption algorithm of the communication system 1000 may include key generation, encryption, and decryption operations. The key generation and the decryption operations may be executed (performed) by the decryption device 1100, and the encryption operation may be executed by the encryption device 1200.

The decryption device 1100 may sample the private key "s" from a normal distribution $\chi$. For example, the normal distribution $\chi$ may be a discrete Gaussian error distribution. For example, a standard deviation $\sigma$ of the normal distribution $\chi$ may be less than "2", but the scope of the inventive concepts are not limited thereto. The decryption device 1100 may sample an error "e" from the normal distribution $\chi$. The error "e" may be used to generate a public key $a_0$. The error may also be referred to as noise.

It is assumed that $f(x)=x^n+1$, $n=2^k$, "n" is a security parameter, "k" is a natural number, $R=Z[x]/f(x)$, and $R_q=Z_q[x]/f(x)$. The $f(x)$ may also be referred to as a reference polynomial. "R" may be a ring of integer polynomials modulo $f(x)$. For example, elements of the ring R may be represented by integer polynomials with a degree less than n. The $R_q$ may be a ring of integer polynomials modulo both $f(x)$ and q. Where "q" may be a prime number that satisfies $q \equiv 1 \mod 2n$, and the "$\equiv$" may mean a congruent. For example, elements of a ring $R_q$ may be represented by integer polynomials having a degree less than n and coefficients less than q.

The decryption device 1100 may sample and generate a public key $a_1$ from the ring $R_q$. The decryption device 1100 may calculate and generate the public key $a_0$, based on the public key $a_1$ and the error e. For example, the decryption device 1100 may calculate the public key $a_0$ by multiplying the public key $a_1$ by the private key s, multiplying a parameter "t" by the error e, and adding the two multiplication results. For example, $a_0$ may be $a_0=-(a_1*s+t*e)$. The decryption device 1100 may invert a sign of the addition result or may further execute a multiplication operation or a subtraction operation on the addition result. The parameter t may be an integer determined in advance and may be used to define a space of a message m described below.

The encryption device 1200 may sample errors u, g, and h from the normal distribution $\chi$. The encryption device 1200 may calculate and generate a cipher text $c_0$, based on the public key $a_0$, the errors u and g, the parameter t, and the message m. The message may also be referred to as data, a plain text, a plain text message, etc. The space of the message m may be the ring $R_q$ or a ring $R_t$. Hereinafter, although the space of the message m is assumed to be the ring $R_t$, the scope of the inventive concepts are not limited thereto. The $R_t$ may be $R_t=Z_t[x]/f(x)$. The t and q may be the prime number relatively, and for example the parameter t may be 2, but the scope of the inventive concepts are not limited thereto. The $R_t$ may be a ring of integer polynomials modulo both $f(x)$ and t. For example, the message m may be represented by integer polynomials having a degree less than n and coefficients less than t. The encryption device 1200 may generate the message m by encoding data to be transmitted to the decryption device 1100. In some example embodiments, the data may be generated inside the encryption device 1200 or may be received from an external device. The decryption device 1100 may encode data into an n bit message m, and the n bit message m may represent integer polynomials corresponding to elements of the ring $R_t$. When n is n=8 and the 8 bit message m is 01011001, then m may be $m=x^6+x^4+x^3+1$.

For example, the encryption device 1200 may calculate the cipher text $c_0$ by multiplying the public key $a_0$ and an error u, multiplying the parameter t and an error g, and adding the two multiplication results and the message m. For example, $c_0$ may be $c_0=a_0*u+t*g+m$. The encryption device 1200 may calculate and generate a cipher text $c_1$, based on the public key $a_1$, the errors u and h, and the parameter t. For example, the encryption device 1200 may calculate the cipher text $c_1$ by multiplying the public key $a_1$ and the error u, multiplying the parameter t and the error h, and adding the two multiplication results. For example, $c_1$ may be $c_1=a_1*u+t*h$.

The decryption device 1100 may calculate and generate a message $\psi$, based on cipher texts $c_0$ and $c_1$ and the private key s. To be distinguished from the message m of the encryption device 1200, since the message $\psi$ is calculated from the cipher texts $c_0$ and $c_1$ transmitted from the encryption device 1200, the message $\psi$ may be referred to as a transmission message $\psi$. For example, the decryption device 1100 may calculate the transmission message $\psi$ by multiplying the cipher text $c_1$ and the private key s and adding the multiplication result and the cipher text $c_0$. Here, the private key s is the same as the private key s of the key generation.

To obtain the plain text message m of the encryption device 1200, the transmission message $\psi$ is decrypted. A conventional decryption device other than the decryption device 1100 may also decrypt the transmission message $\psi$. However, depending on sizes of the errors u, g, and h used by the encryption device 1200, an error of the decryption operation may occur in the conventional decryption device, and a message different from the plain text message m may be calculated in the conventional decryption device. In particular, when the sizes of the errors u, g, and h exceed a specific level (a specific value), the message different from the plain text message m may be calculated or restored in the conventional decryption device. The errors u, g, and h in the encryption device 1200 are used to reduce or prevent an attacker from easily obtaining the plain text message m. That is, the RLWE encryption algorithm uses a method of intentionally adding errors u, g, and h such that an attacker may not easily obtain the plain text message m. Therefore, when the sizes of the errors u, g, and h that the encryption device 1200 is able to use are limited due to errors of the decryption operation, which may occur in the conventional decryption device, because of the sizes of the errors u, g, and h, a problem occurs in that the security of the encryption algorithm is weak.

To address the above-described problem, the decryption device 1100 according to some example embodiments of the inventive concepts does not decrypt the transmission message $\psi$ as it is. Instead, the decryption device 1100 may calculate and generate a modified transmission message $\psi'$ by modifying, changing, or tuning the transmission message $\psi$. For example, the decryption device 1100 may decide a coefficient of the modified transmission message $\psi'$, based on a size of the coefficient of the transmission message $\psi$. Since the transmission message $\psi$ may include multiple coefficients depending on a dimension of the polynomial, the decryption device 1100 may decide each of coefficients of the modified transmission message $\psi'$. The decryption device 1100 may decide the coefficient of the modified transmission message $\psi'$ by using a determination function $\zeta$. Referring to FIG. 1, the coefficient of the transmission message $\psi$ may be represented as coef($\psi$), the coefficient of the modified transmission message $\psi'$, that is, the coefficient decided by the determination function may be expressed as coef($\psi'$). The modified transmission message $\psi'$ may also be referred to as a modified message $\psi'$.

For example, when coef($\psi$) is greater than a reference value q/2 (>; or more than ($\geq$)) and coef($\psi$) is even, the decryption device 1100 may decide coef($\psi'$) as 1 (coef($\psi'$) =1) by modifying coef($\psi$) to 1. When coef($\psi$) is greater than the reference value q/2 (>; or equal to or greater than ($\geq$)) and coef($\psi$) is odd, the decryption device 1100 may decide coef($\psi'$) as 0 (coef($\psi'$)=0) by modifying coef($\psi$) to 0. When coef($\psi$) is less than the reference value q/2 (<; or equal to or less than ($\leq$)), the decryption device 1100 may maintain coef($\psi$) and may decide coef($\psi'$) as coef($\psi$). For example, the decryption device 1100 may calculate the reference value q/2 by performing a division operation on the prime number q, and one of a round operation, a floor operation, and a ceil operation on a result of the division operation of divisor "2". As a matter of course, the reference value is not limited to q/2. The decryption device 1100 may calculate the reference value by performing a division operation of divisor that is any natural number, not 2, on the prime number, and one of the round operation, the floor operation, and the ceil operation on a result of the division operation.

For example, the transmission message $\psi$ may have a coefficient greater than (or equal to) the reference value q/2, but the modified transmission message $\psi'$ does not have a coefficient greater than (or, equal to) the reference value q/2. In some example embodiments, when all coefficients of the transmission message $\psi$ are less than the reference value q/2, the modified transmission message $\psi'$ may be the same as the transmission message $\psi$.

The decryption device 1100 may decrypt the modified transmission message $\psi'$ having a coefficient decided by the determination function instead of the transmission message $\psi$. For example, the decryption device 1100 may calculate a decryption message m'' by performing a modulo operation (e.g., $\psi'$ mod t) on the modified transmission message $\psi'$, and may restore the plain text message m. For example, the divisor of the modulo operation of the decryption may be the parameter t. For example, the parameter t may be 2, but the inventive concepts are not limited thereto. Here, the parameter t is the same as the parameter t of the key generation. Since the decryption device 1100 decides the coefficient of the transmission message $\psi$ and decrypts the modified transmission message $\psi'$ having the decided coefficient instead of the transmission message $\psi$, the decryption device 1100 may address a problem in which sizes of the errors u, g, and h used in the encryption device 1200 are limited due to a decryption error of the transmission message $\psi$.

Hereinafter, operation examples of the conventional decryption device that decrypts the transmission message $\psi$ and the decryption device 1100 that decrypts the modified transmission message $\psi'$ will be described. However, the scope of the inventive concepts are not limited to numerical values described below. It is assumed that n is 8, q is 257, and t is 2. It is assumed that the plain text message m is {degree (7)} [1. 0. 0. 0. 0. 1. 1. 1.] (e.g., m=$x^7+x^2+x^1+1$). It is assumed that the decryption device 1100 generates the public key $a_0$ of {degree (7)} [161. −207. −91. −170. 100. −76. −49. −185.] (e.g., $a_0=161x^7-207x^6-91x^5-170x^4+100x^3-76x^2-49x^1-185$) and the public key $a_1$ of {degree (7)} [77. −118. −150. 173. 167. 133. 5. −183.] (e.g., $a_1=77x^7-118x^6-150x^5+173x^4+167x^3+133x^2+5x^1-183$). It is assumed that the encryption device 1200 generates the cipher text $c_0$ of {degree (7)} [−25. 125. 234. 89. −48. −44. −3. −67.] (e.g., $c_0=-25x^7+125x^6+234x^5+89x^4-48x^3-44x^2-3x^1-67$) and the cipher text $c_1$ of {degree (7)} [216. −136. 5. −39. −13. 21. −176.] (e.g., $c_1=216x^7-136x^6+178x^5+5x^4-39x^3-13x^2+21x^1-176$) from the above-described public keys $a_0$ and $a_1$. It is assumed that the decryption device 1100 calculates the transmission message $\psi$ of {degree (7)} [−11. 253. 2. −2. 0. −5. −3. −254.] (e.g., $\psi=-11x^7+253x^6+2x^5-2x^4-5x^2-3x^1-254$) from the above-described cipher texts $c_0$ and $c_1$.

The conventional decryption device will decrypt the transmission message $\psi$ and may perform a modulo operation of the divisor having a parameter t on the transmission message $\psi$. The conventional decryption device may calculate a decryption message m' of {degree (7)} [1. 1. 0. 0. 0. 1. 1. 0.] (e.g., m'=$x^7+x^6+x^2+x^1$) as a result of the decryption. The decryption message m' of the conventional decryption device is different from the plain text message m.

In contrast, the decryption device 1100 may calculate the modified transmission message $\psi'$ by modifying the transmission message $\psi$. The decryption device 1100 may decide each of the coefficients of the modified transmission message $\psi'$ and may calculate the modified transmission message $\psi'$ of {degree (7)} [−11. 0. 2. −2. 0. −5. −3. 1.] (e.g., $\psi'=-11x^7+2x^5-2x^4-5x^2-3x^1+1$). Referring to the transmission message $\psi$ and the modified transmission message $\psi'$ together, the decryption device 1100 may maintain the coefficients (−11, 2, −2, 0, −5, −3) of $x^7, x^5, x^4, x^3, x^2, x^1$, which are less than the reference value 257/2, based on the determination function $\zeta$, may modify the coefficient 253 of $x^6$, which is greater than the reference value 257/2 and is odd, to 0, and may modify the coefficient −254 of $x^0$, which is greater than the reference value 257/2 and is even, to 1. The decryption device 1100 may perform a modulo operation of a divisor having the parameter t on the modified transmission message $\psi'$. The decryption device 1100 may calculate the decryption message m'' (e.g., m''=$x^7+x^2+x^1+1$) of {degree (7)} [1. 0. 0. 0. 0. 1. 1. 1.] as a result of the decryption. The decryption message m'' of the decryption device 1100 is the same as the plain text message m. That is, the conventional decryption device calculates the decryption message m' different from the plain text message m, but the decryption device 1100 may calculate the decryption message m″ that is identical to the plain text message m regardless of the sizes of the errors u, g, and h.

Figure 2:
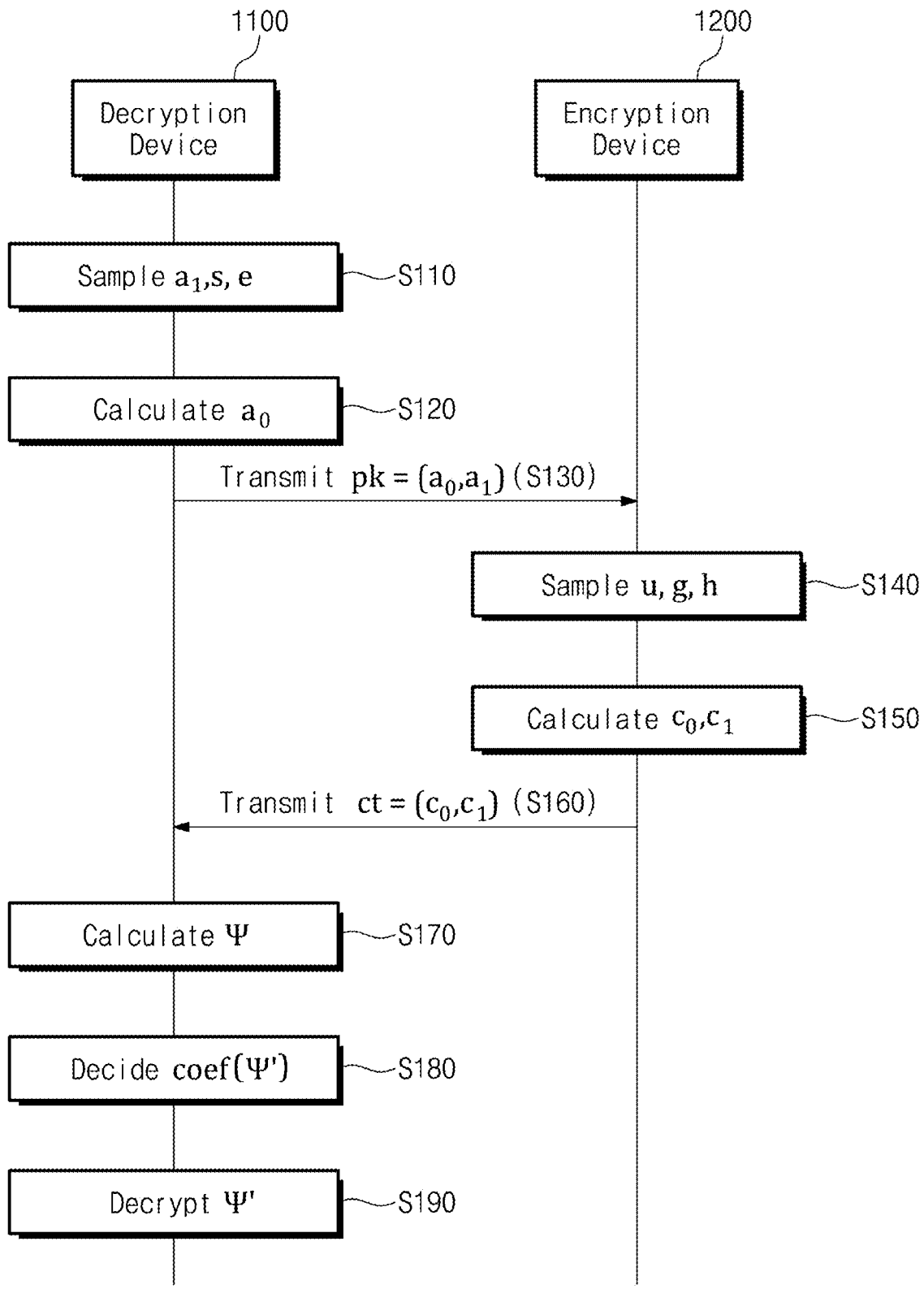
FIG. 2 is a flowchart illustrating an operating method of the communication system of FIG. 1.

FIG. 2 is a flowchart illustrating an operating method of the communication system of FIG. 1. Operations S110 and S120 that are performed by the decryption device 1100 may correspond to a key generation of the RLWE encryption algorithm, operations S140 and S150 that are performed by the encryption device 1200 may correspond to the encryption of the RLWE encryption algorithm, and operations S170 to S190 that are performed by the decryption device 1100 may correspond to the decryption of the RLWE encryption algorithm.

In operation S110, the decryption device 1100 may sample the public key $a_1$ from the ring $R_q$, may sample the private key s from the normal distribution $\chi$, and may sample error e from the normal distribution $\chi$. As described above, f(x) is an nth order integer polynomial. For example, each of the public key $a_1$, the private key s, and the error e are an n−1th order integer polynomial and may have coefficients less than the prime number q.

In operation S120, the decryption device 1100 may calculate the public key $a_0$, based on the private key s and the public key $a_1$. The decryption device 1100 may calculate the public key $a_0$ by adding the error e to the multiplication result of the private key s and the public key $a_1$. For example, the public key $a_0$ is an n−1th order integer polynomial and may have coefficients less than the prime number q.

In operation S130, the decryption device 1100 may transmit (provide or output) public keys (pk=($a_0$ and $a_1$)) to the encryption device 1200. The encryption device 1200 may receive the public keys (pk=($a_0$ and $a_1$)) from the decryption device 1100.

In operation S140, the encryption device 1200 may sample the errors u, g, and h from the normal distribution $\chi$. The normal distribution $\chi$ that is used by the decryption device 1100 may be different from the normal distribution $\chi$ that is used by the encryption device 1200. For example, each of the errors u, g, and h is an n−1th order integer polynomial and may have coefficients less than the prime number q.

In operation S150, the encryption device 1200 may calculate the cipher texts $c_0$ and $c_1$. The encryption device 1200 may calculate the cipher text $c_0$, based on the public key $a_0$ and the plain text message m. For example, the plain text message m is an n−1th order integer polynomial and may have coefficients less than the parameter t. For another example, the plain text message m is an n−1th order integer polynomial and may have coefficients less than the prime number q. The encryption device 1200 may calculate the cipher text $c_0$ by adding the multiplication result of the public key $a_0$ and the error u, the multiplication result of the parameter t and the error g, and the plain text message m. The encryption device 1200 may calculate the cipher text $c_1$, based on the public key $a_1$. The encryption device 1200 may calculate the cipher text $c_1$ by adding the multiplication result of the public key $a_1$ and the error u and the multiplication result of the parameter t and the error h. For example, each of the cipher texts $c_0$ and $c_1$ is an n−1th order integer polynomial and may have coefficients less than the prime number q.

In operation S160, the encryption device 1200 may transmit the cipher texts (ct=($c_0$ and $c_1$)) to the decryption device 1100. The decryption device 1100 may receive the cipher texts (ct=($c_0$ and $c_1$)) from the encryption device 1200.

In operation S170, the decryption device 1100 may calculate the transmission message $\psi$, based on the cipher texts $c_0$ and $c_1$ and the private key s. The decryption device 1100 may calculate the transmission message $\psi$ by adding the multiplication result of the cipher text $c_1$ and the private key s with the cipher text $c_0$. For example, the transmission message $\psi$ is an n−1th order integer polynomial and may have coefficients less than the prime number q.

In operation S180, the decryption device 1100 may calculate the modified transmission message $\psi'$ by modifying the transmission message $\psi$. For example, the modified transmission message $\psi'$ is an n−1th order integer polynomial and may have coefficients less than the prime number q. The decryption device 1100 may decide the coefficient of the modified transmission message $\psi'$ depending on the comparison result of the coefficient of the transmission message $\psi$ and the reference value q/2 based on the prime number q.

In operation S190, the decryption device 1100 may decrypt the modified transmission message $\psi'$ and may calculate the decryption message m″. For example, the decryption device 1100 may perform a modulo operation of a divisor having the parameter t on the modified transmission message $\psi'$.

Figure 3:
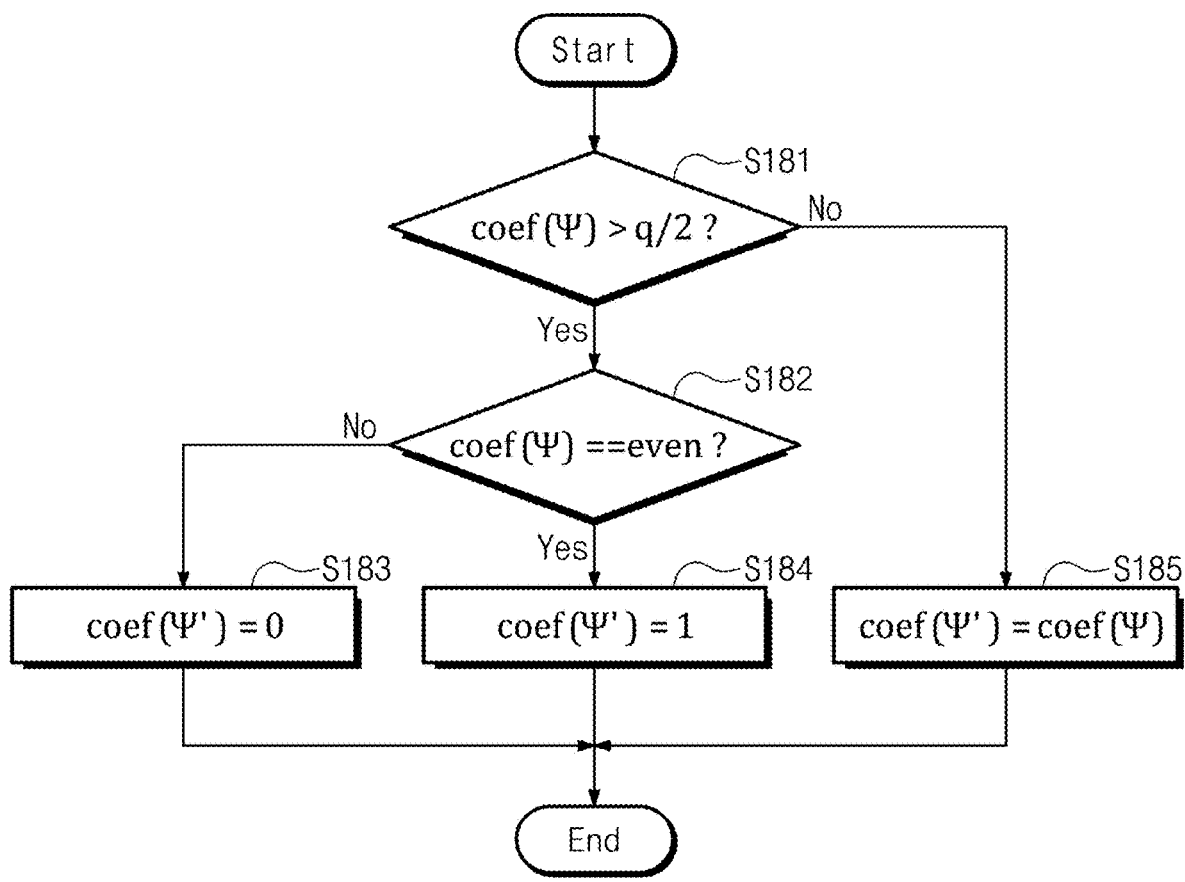
FIG. 3 is a flowchart illustrating detailed operations of operation S180 of FIG. 2 in more detail.

FIG. 3 is a flowchart illustrating detailed operations of operation S180 of FIG. 2 in more detail.

Referring to FIGS. 2 and 3, in operation S181, the decryption device 1100 may decide whether the coefficient coef($\psi$) of the transmission message $\psi$ is greater than (>; or equal to or greater than ($\geq$)) the reference value q/2. As described above, the decryption device 1100 may perform a division operation on the prime number q, and one of a round operation, a floor operation, and a ceil operation on a result of the division operation of divisor 2, and may calculate the execution result of the division operation and one of the round operation, a floor operation, and a ceil operation as the reference value. For example, the decryption device 1100 may compare coef w and the reference value q/2.

When coef($\psi$)>q/2 or coef($\psi$)$\geq$q/2, in operation S182, the decryption device 1100 may check whether coef($\psi$) is even or odd. For example, the decryption device 1100 may perform a division operation of the divisor 2 on coef($\psi$) and may check a remainder. The decryption device 1100 may divide coef($\psi$) by 2 and may check the remainder. Here, 2 is due to the above-described parameter t.

When coef($\psi$) is odd, in operation S183, the decryption device 1100 may decide coef($\psi'$), which is a coefficient of the modified transmission message $\psi'$, as 0, and may modify coef($\psi$) to 0. When coef($\psi$) is even, in operation S184, the decryption device 1100 may decide coef($\psi'$) as 1 and may modify coef($\psi$) to 1. When coef($\psi$)<q/2 or coef($\psi$)<q/2, in operation S185, the decryption device 1100 may decide coef($\psi'$) as coef($\psi$) and may maintain coef($\psi$).

Operations S181 to S185 described above with reference to FIG. 3 relate to some example embodiments in which the parameter t is 2. For example, the parameter t may be 2 or more. Unlike the illustrating of FIG. 3, in operation S182, the decryption device 1100 may divide coef($\psi$) by the parameter t and may check the remainder. Unlike the illustrating of FIG. 3, in operation S183 and operation S184, the decryption device 1100 may decide coef($\psi'$) as one of a plurality of values and may modify coef($\psi$) to the corresponding value, based on the remainder. The plurality of values may be values that the remainder may have. In summary, when coef($\psi$) is less than or equal to the reference value q/2, coef($\psi'$) may be coef($\psi$). When coef($\psi$) is greater than or equal to the reference value q/2, coef($\psi'$) may be modified to one of the values that the remainder when dividing the coef($\psi$) by the parameter t may have.

Figure 4:
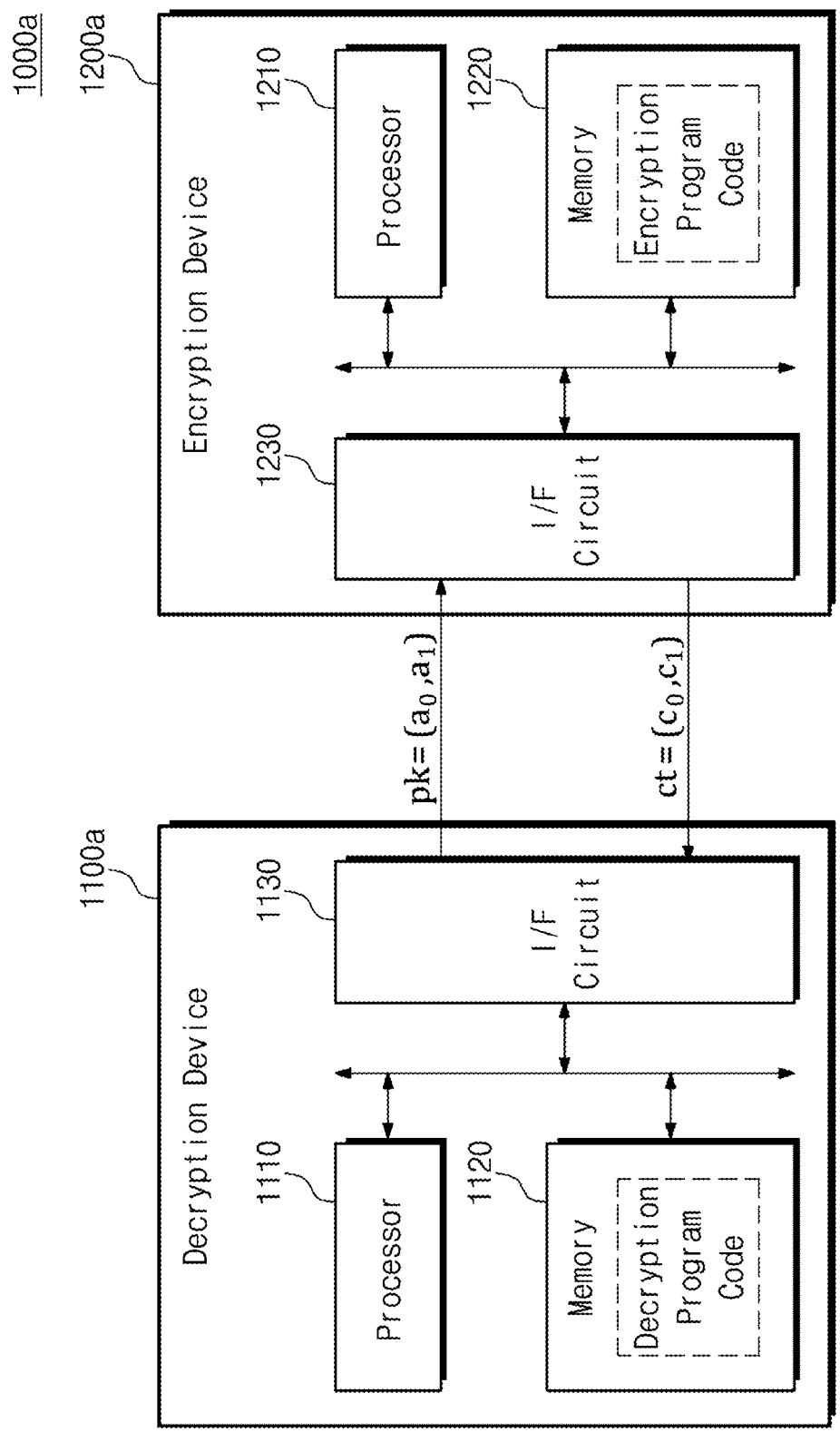
FIG. 4 is a block diagram illustrating in more detail a communication system of FIG. 1 according to some example embodiments of the inventive concepts.

FIG. 4 is a block diagram illustrating in more detail a communication system of FIG. 1 according to some example embodiments of the inventive concepts.

Referring to FIGS. 1 and 4, a communication system 1000a may be an example of the communication system 1000 of FIG. 1 such that decryption device 1100a may be an example of the decryption device 1100 of FIG. 1 and an encryption device 1200a may be an example of the encryption device 1200 of FIG. 1.

The decryption device 1100a may include a processor 1110, a memory 1120, and an interface circuit 1130, which communicate with one another through an internal bus. The processor 1110 may execute decryption program code stored in the memory 1120 as a hardware device. For example, the processor 1110 may include homogeneous or heterogeneous multiple cores and a cache memory, etc. shared by the multiple cores. The homogeneous or heterogeneous multiple cores may include a central processing unit (CPU), an image signal processing unit (ISP), a digital signal processing unit (DSP), a graphics processing unit (GPU), a vision processing unit (VPU), and a neural processing unit (NPU)). The processor 1110 may perform processing operations such as fetching, executing, requesting data, and storing data for instructions of the decryption program code and arithmetic operations. For example, the processor 1110 may control the memory 1120 and the interface circuit 1130. The number of processors 1110 may be one or more.

The memory 1120 may be a non-transitory computer readable medium that stores the decryption program code executable by the processor 1110, that is, a hardware device. For example, the memory 1120 may be implemented using various memory devices, such as a dynamic random access memory (DRAM) device, a static random access memory (SRAM) device, a thyristor random access memory (TRAM) device, a NAND flash memory device, and a NOR flash memory device, a resistive random access memory (RRAM) device, a ferroelectric random access memory (FRAM) device, a phase change random access memory (PRAM) device, a magnetic random access memory (MRAM) device, etc. The number of memories 1120 may be one or more. In addition, the memory 1120 may be implemented with an external device capable of communicating with the decryption device 1100.

The decryption program code that is stored in the memory 1120 and executed by the processor 1110 may include instructions for key generation and decryption of the RLWE encryption algorithm described above with reference to FIGS. 1 to 3. For example, the processor 1110 may perform key generation and decryption of the RLWE encryption algorithm described above with reference to FIGS. 1 to 3 by executing the decryption program code stored in the memory 1120, and may perform operations S110, S120, S170, S180 including S181 to S185, and S190. In addition, the processor 1110, while performing above operations, may generate the normal distribution $\chi$, the numbers k and q, the security parameter n, the parameter t, the public keys $a_0$ and $a_1$, the private key s, the error e, the cipher texts $c_0$ and $c_1$, the transmission message $\psi$, the modified transmission message $\psi'$, and the intermediate operation result (or results) of above-described operations, and may store the generated information in the memory 1120.

The interface circuit 1130 may communicate with an interface circuit 1230 of the encryption device 1200a, based on various wired or wireless protocols, as a hardware device. The interface circuit 1130 may transmit the public keys $a_0$ and $a_1$ that is generated by the processor 1110 and stored in the memory 1120 to the interface circuit 1230 of the encryption device 1200a in response to a request of the processor 1110. The interface circuit 1130 may receive the cipher texts $c_0$ and $c_1$ that are transmitted from the interface circuit 1230 of the encryption device 1200a and may provide the cipher texts $c_0$ and $c_1$ to the memory 1120 or the processor 1110.

The encryption device 1200a may include a processor 1210, a memory 1220, and the interface circuit 1230, which communicate with one another through an internal bus. The processor 1210 may execute encryption program code stored in the memory 1220, as a hardware device. For example, the processor 1210 may be implemented similarly to the processor 1110. The processor 1210 may execute processing operations such as fetching, executing, requesting data, and storing data for instructions of the encryption program code and arithmetic operations. For example, the processor 1210 may control the memory 1220 and the interface circuit 1230. The number of the processor 1210 may be one or more.

The memory 1220 may be a non-transitory computer readable medium that stores encryption program code executable by the processor 1210, that is, a hardware device. For example, the memory 1220 may be implemented similarly to the memory 1120. The number of memories 1220 may be one or more. In addition, the memory 1220 may be implemented with an external device capable of communicating with the encryption device 1200a.

The encryption program code that is stored in the memory 1220 and is executed by the processor 1210 may include instructions related to encryption of the RLWE encryption algorithm described above with reference to FIGS. 1 to 3. For example, the processor 1210 may perform encryption of the RLWE encryption algorithm described above in FIGS. 1 to 3 by executing the encryption program code stored in the memory 1220, and may perform operations S140 and S150. In addition, the processor 1210, while performing above operations, may generate the normal distribution $\chi$, the numbers k and q, the security parameter n, the parameter t, the public keys $a_0$ and $a_1$, the errors u, g, and h, the cipher texts $c_0$ and $c_1$, and the intermediate operation result (or results) of above-described operations, and may store the generated information in the memory 1220.

The interface circuit 1230 may communicate with the interface circuit 1130 of the decryption device 1100a, based on various wired or wireless protocols, as a hardware device. The interface circuit 1230 may transmit the cipher texts $c_0$ and $c_1$ that are generated by the processor 1210 and are stored in the memory 1220 to the interface circuit 1130 of the decryption device 1100a in response to a request of the processor 1210. The interface circuit 1230 may receive the public keys $a_0$ and $a_1$ that are transmitted from the interface circuit 1130 of the decryption device 1100a, and may provide the public keys $a_0$ and $a_1$ to the memory 1220 or the processor 1210.

Figure 5:
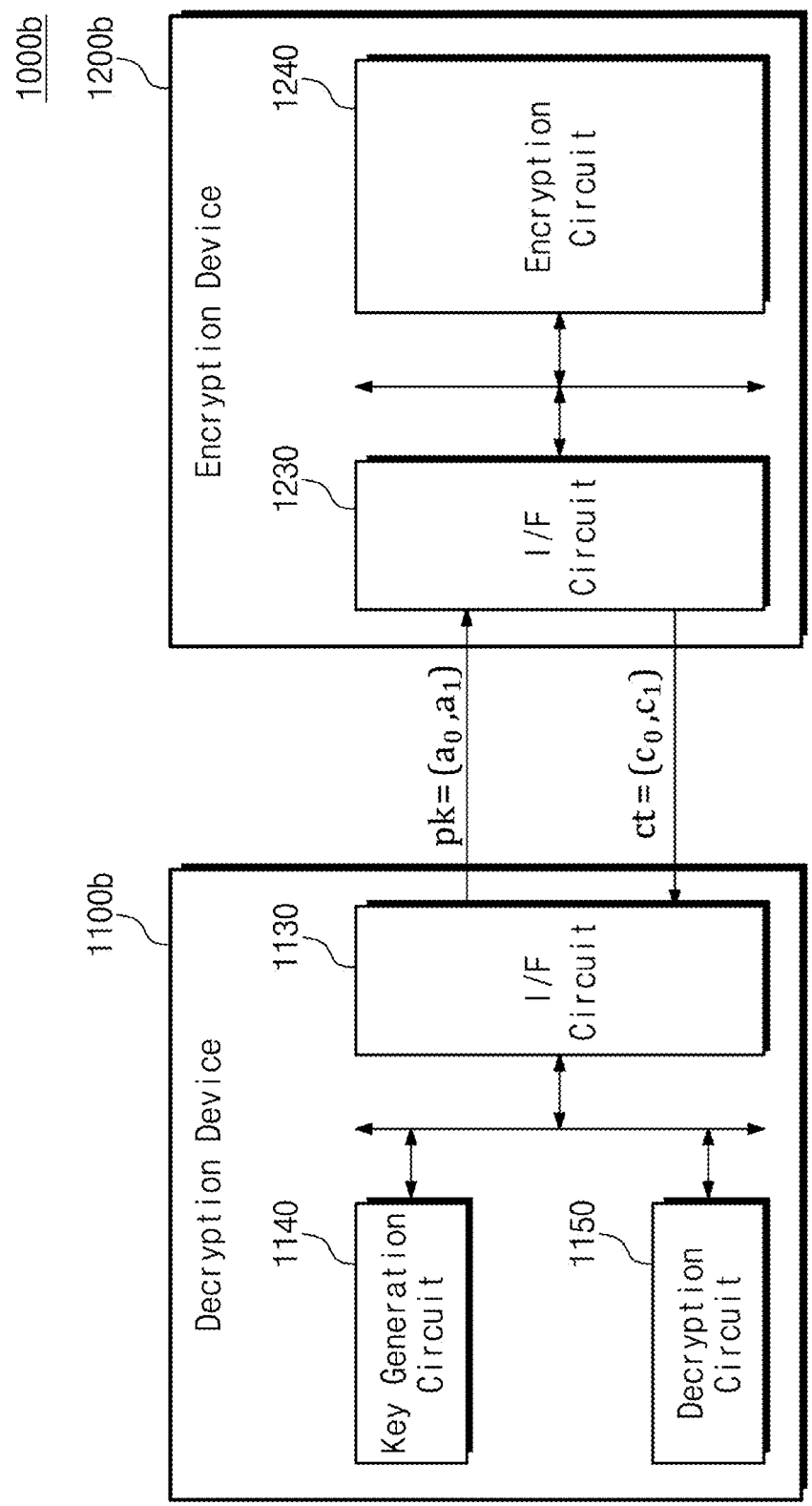
FIG. 5 is a block diagram illustrating in more detail a communication system of FIG. 1 according to some example embodiments of the inventive concepts.

FIG. 5 is a block diagram illustrating in more detail a communication system of FIG. 1 according to some example embodiments of the inventive concepts.

Referring to FIGS. 1, 4 and 5, a communication system 1000b may be an example of the communication system 1000 of FIG. 1 such that the decryption device 1100b may be an example of the decryption device 1100 of FIG. 1 and the encryption device 1200b may be an example of the encryption device 1200 of FIG. 1. A difference between the communication system 1000b and the communication system 1000a will be mainly described. The communication system 1000a may be an example of the communication system 1000 implemented in a hardware manner and a software manner. In contrast, the communication system 1000b may be an example of the communication system 1000 implemented in the hardware manner.

The decryption device 1100b may include a key generation circuit 1140, a decryption circuit 1150, and the interface circuit 1130, which communicate with one another through an internal bus. The key generation circuit 1140 may perform the key generation of the RLWE encryption algorithm described above with reference to FIGS. 1 to 3 and may perform operations S110 and S120. The key generation circuit 1140, while performing above-described operations, may generate and store the normal distribution $\chi$, the numbers k and q, the security parameter n, the parameter t, the public keys $a_0$ and $a_1$, the private key s, the error e, and the intermediate operation result (or results) of above-described operations. For example, a storing location may be an internal memory of the key generation circuit 1140 or a memory of the decryption device 1100b. The decryption circuit 1150 may perform the decryption of the RLWE encryption algorithm described above with reference to FIGS. 1 to 3, and may perform operations S170, S180 including S181 to S185, and S190. The decryption circuit 1150, while performing above operations, may generate and store the cipher texts $c_0$ and $c_1$, the transmission message w, the modified transmission message $\psi'$, and the intermediate operation result (or results) of above-described operations. For example, the storing location may be an internal memory of the decryption circuit 1150 or the memory of the decryption device 1100b. For example, the decryption device 1100b may further include the processor 1110 and the memory 1120 of FIG. 4. The interface circuit 1130 of the decryption device 1100b may be implemented similarly to the interface circuit 1130 of FIG. 4. Each of the key generation circuit 1140, the decryption circuit 1150, and the interface circuit 1130 may include analog circuit(s), digital circuit(s), logic circuit(s), etc. to perform above-described operations.

The encryption device 1200b may include an encryption circuit 1240 and the interface circuit 1230, which communicate with one another through an internal bus. The encryption circuit 1240 may perform the encryption of the RLWE encryption algorithm described above with reference to FIGS. 1 to 3 and may perform operations S140 and S150. The encryption circuit 1240, while performing above-described operations, may generate and store the normal distribution $\chi$, the numbers k and q, the security parameter n, the parameter t, the public keys $a_0$ and $a_1$, the errors u, g, and h, the cipher texts $c_0$ and $c_1$, and the intermediate operation result (s) of above-described operations. For example, the storing location may be an internal memory of the encryption circuit 1240 or a memory of the encryption device 1200b. For example, the encryption device 1200b may further include the processor 1210 and the memory 1220 of FIG. 4. The interface circuit 1230 of the encryption device 1200b may be implemented similarly to the interface circuit 1230 of FIG. 4. Each of the encryption circuit 1240 and the interface circuit 1230 may include analog circuit(s), digital circuit(s), logic circuit(s), etc. to perform above-described operations.

Figure 6:
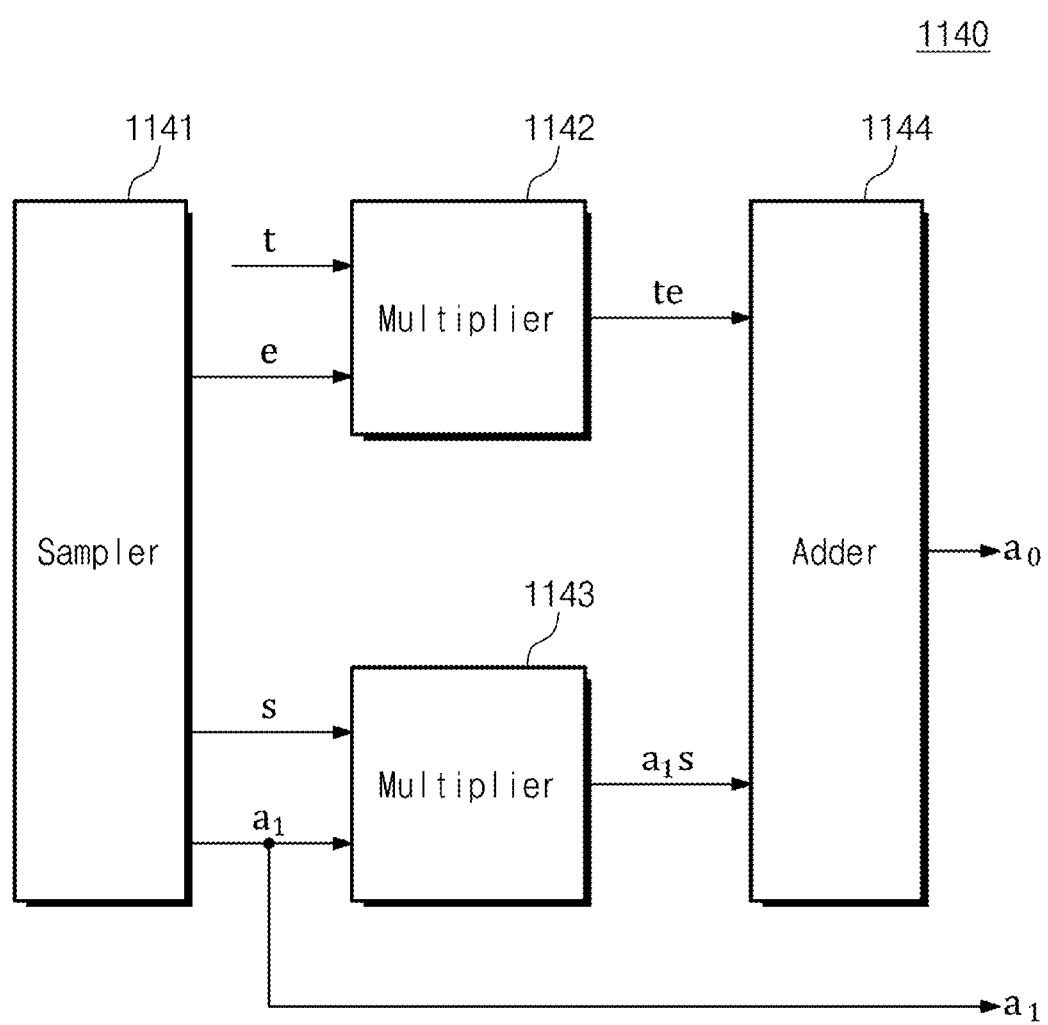
FIG. 6 is a block diagram illustrating a key generation circuit of FIG. 5.

FIG. 6 is a block diagram illustrating a key generation circuit of FIG. 5.

Referring to FIGS. 5 and 6, the key generation circuit 1140 may include processing circuitry configured to perform the functions of a sampler 1141, a multiplier 1142, a multiplier 1143, and an adder 1144.

The sampler 1141 may generate the normal distribution $\chi$ and may sample the private key s and the error e from the normal distribution $\chi$. In addition, the sampler 1141 may sample the public key $a_1$ from the ring $R_q$. The multiplier 1142 may multiply the parameter t and the error e and may provide the multiplication result te to the adder 1144. The multiplier 1142 may multiply the public key $a_1$ by the private key s and may provide the multiplication result $a_1*s$ to the adder 1144. The adder 1144 may add the two multiplication results te and $a_1*s$ and may calculate the public key $a_0$. Although not illustrated, the adder 1144 may further include an internal circuit that inverts a sign of the addition result or performs a multiplication operation or a subtraction operation on the addition result. The key generation circuit 1140 may provide the public keys $a_0$ and $a_1$ to the memory of the interface circuit 1130 or the decryption device 1100b. The key generation circuit 1140 may provide the private key s to the decryption circuit 1150. Regardless of the implementation method, the private key s is not provided outside of the decryption device 1100b.

Figure 7:
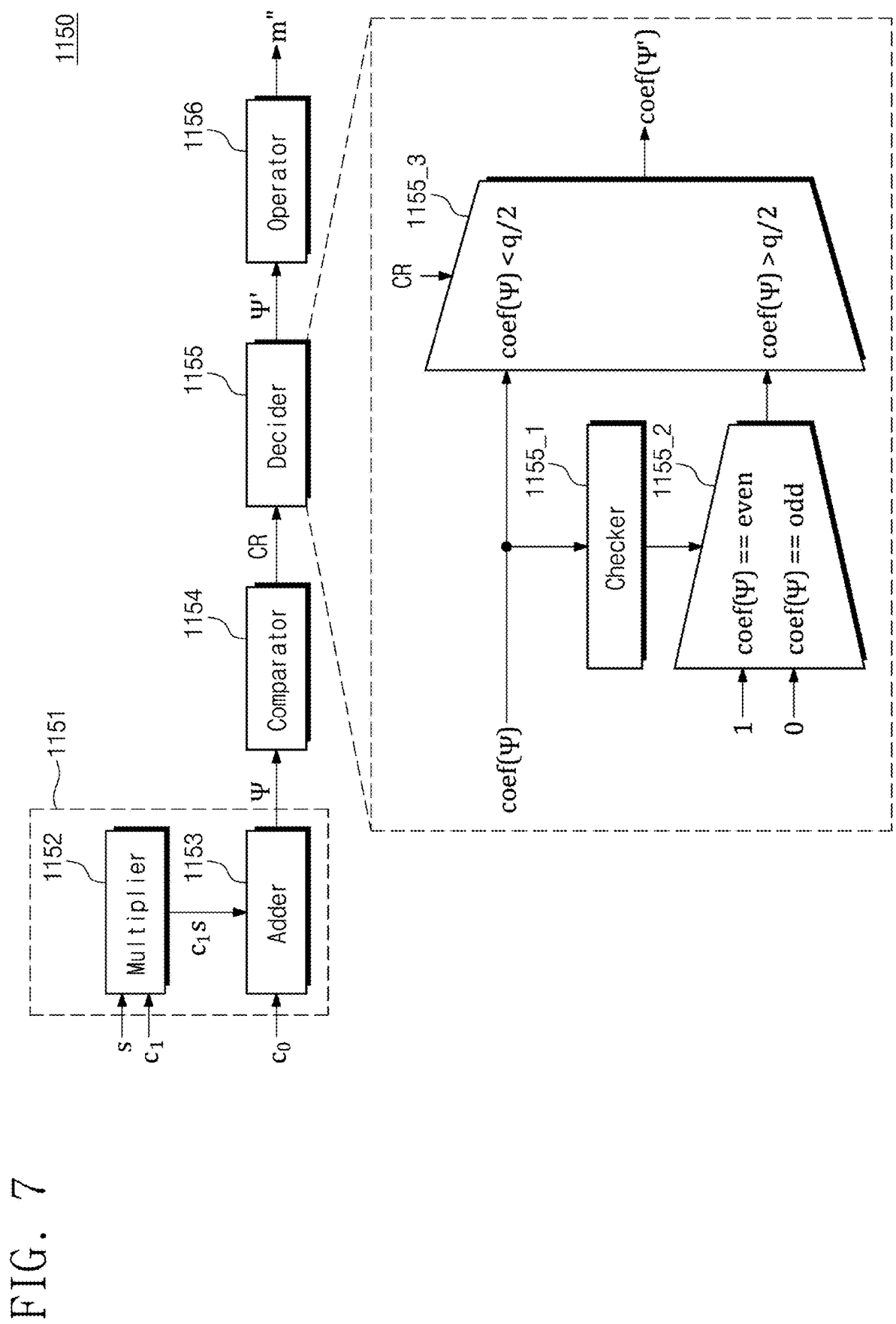
FIG. 7 is a block diagram illustrating a decryption circuit of FIG. 5.

FIG. 7 is a block diagram illustrating a decryption circuit of FIG. 5.

Referring to FIGS. 5 and 7, the decryption circuit 1150 may include processing circuitry configured to perform the functions of a calculator 1151 including a multiplier 1152 and an adder 1153, a comparator 1154, a decider 1155, and an operator 1156.

The multiplier 1152 may multiply the cipher text $c_1$ and the private key s and may provide the multiplication result cis to the adder 1153. The adder 1153 may add the multiplication result cis and the cipher text $c_0$ and may calculate the transmission message $\psi$. The comparator 1154 may compare the transmission message $\psi$ with the reference value q/2 and may provide the comparison result CR to the decider 1155. The decider 1155 may decide the coefficient of the modified transmission message $\psi'$, based on the comparison result CR and may provide the modified transmission message $\psi'$ to the operator 1156. The operator 1156 may execute the decryption operation on the modified transmission message $\psi'$ (e.g., a modulo operation with the divisor having the parameter t) and may generate the decryption message m".

The decider 1155 may include processing circuitry configured to perform the functions of a checker 1155_1, a multiplexer 1155_2, and a multiplexer 1155_3.

The checker 1155_1 may check whether coef (w) is even or odd. For example, the checker 1155_1 may perform a division operation in which the divisor is the parameter t on coef($\psi$) and may check the remainder. The checker 1155_1 may provide a check result (or the remainder) to the multiplexer 1155_2. The multiplexer 1155_2 may select one of a plurality of values (0, 1), based on the check result and may provide the selected value to the multiplexer 1155_3. The multiplexer 1155_2 may select 1, based on a check result indicating that coef($\psi$) is even. The multiplexer 1155_2 may select 0, based on a check result indicating that coef($\psi$) is odd. FIG. 7 relates to some example embodiments where the parameter t is 2, and the number of multiple values that the multiplexer 1155_2 may select may be 2 or more depending on the value of the parameter t that is 2 or more. The multiplexer 1155_3 may select one of coef($\psi$) and a value (0 or 1) selected by the multiplexer 1155_2, based on the comparison result CR and may output the selected value as coef($\psi'$). The multiplexer 1155_3 may select coef($\psi$), based on a comparison result CR indicating that coef($\psi$)<q/2 or coef($\psi$)≤q/2. The multiplexer 1155_3 may select a value (0 or 1) selected by the multiplexer 1155_2, based on a comparison result CR indicating that coef($\psi$)>q/2 or coef($\psi$)≥q/2.

Figure 8:
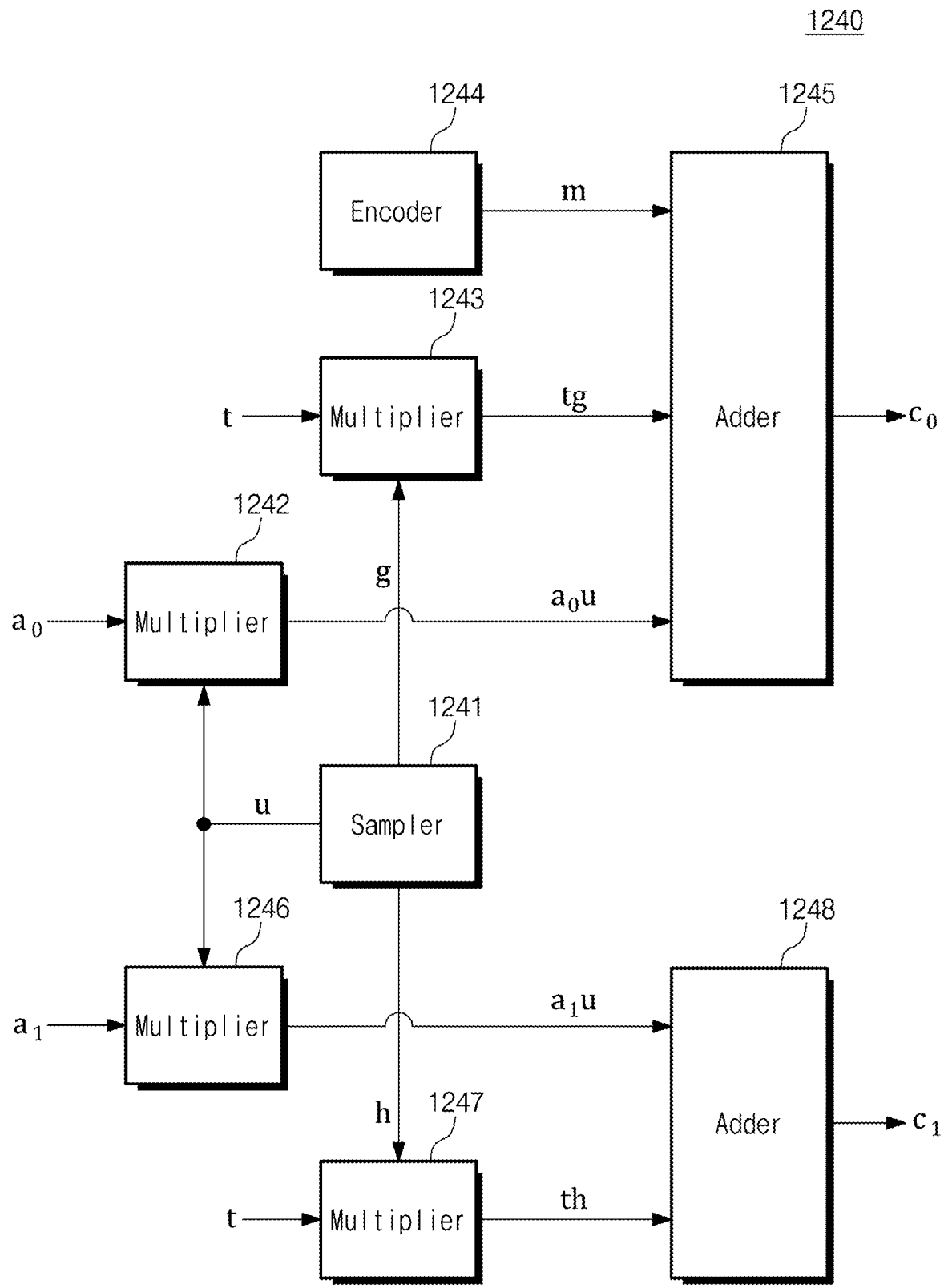
FIG. 8 is a block diagram illustrating an encryption circuit of FIG. 5.

FIG. 8 is a block diagram illustrating an encryption circuit of FIG. 5.

Referring to FIGS. 5 and 8, the encryption circuit 1240 may include processing circuitry configured to perform the functions of a sampler 1241, a multiplier 1242, a multiplier 1243, an encoder 1244, an adder 1245, a multiplier 1246, a multiplier 1247, and an adder 1248.

The sampler 1241 may generate the normal distribution $\chi$ and may sample the errors u, g, and h from the normal distribution $\chi$. The sampler 1241 may provide the error u to the multipliers 1242 and 1246, may provide the error g to multiplier 1243, and may provide the error h to multiplier 1247. The multiplier 1242 may multiply the public key $a_0$ and the error u and may provide the multiplication result $a_0 u$ to the adder 1245. The multiplier 1243 may multiply the parameter t and the error g and may provide the multiplication result tg to the adder 1245. The encoder 1244 may encode data of the encryption device 1200*b* and may generate the message m. For example, the encoder 1244 may encode the data to generate an n-bit message m belonging to the ring ($R_f = Z_t[x]/f(x)$). The adder 1245 may add two multiplication results $a_0 u$ and tg and the message m to generate the cipher text $c_0$. The multiplier 1246 may multiply the public key $a_1$ and the error u and may provide the multiplication result $a_1 u$ to the adder 1248. The multiplier 1246 may multiply the parameter t and the error h and may provide the multiplication result th to the adder 1248. The adder 1248 may add two multiplication results $a_1 u$ and th to generate the cipher text $c_1$.

Figure 9:
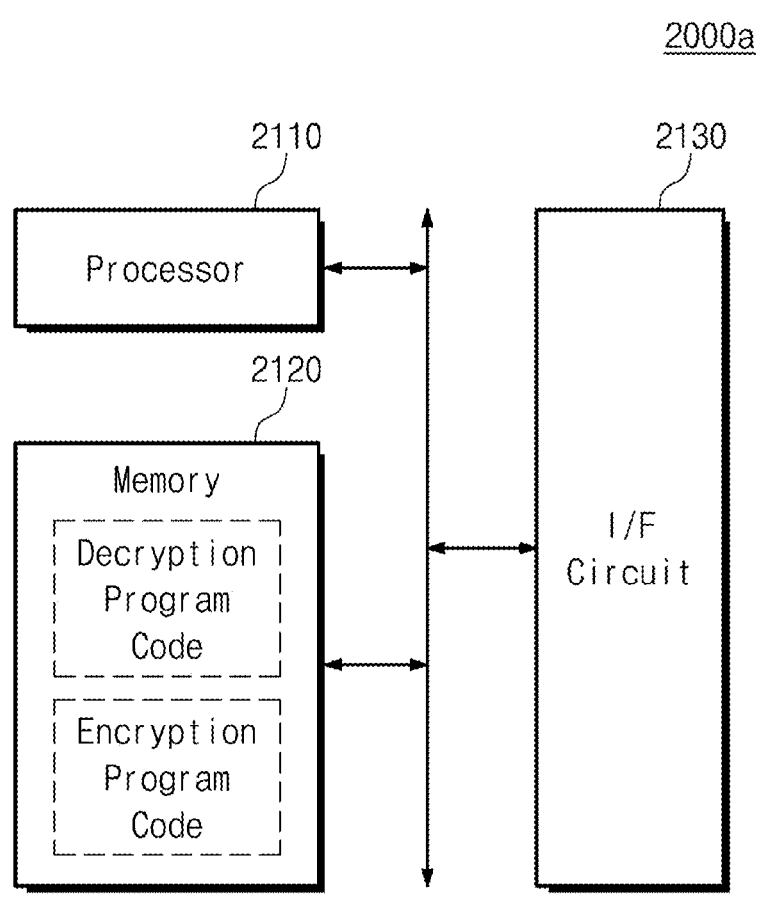
FIG. 9 is a block diagram illustrating an encryption/decryption device according to some example embodiments of the inventive concepts.

FIG. 9 is a block diagram illustrating an encryption/decryption device according to some example embodiments of the inventive concepts.

Referring to FIG. 9, an encryption/decryption device 2000*a* may communicate with other electronic devices (not illustrated) and may perform the key generation, the encryption, and the decryption of the RLWE described with reference to FIGS. 1 to 8.

The encryption/decryption device 2000*a* may include a processor 2110, a memory 2120, and an interface circuit 2130, which communicate with one another through an internal bus. For example, the processor 2110 may be implemented similarly to the processors 1110 and 1210, and may execute both the encryption program code and the decryption program code that are stored in the memory 2120. The memory 2120 may be implemented similarly to the memories 1120 and 1220 and may store the encryption program code and the decryption program code executable by the processor 2110. The interface circuit 2130 may be implemented similarly to the interface circuits 1130 and 1230, may transmit the public keys $a_0$ and $a_1$ to another electronic device, may receive the public keys $a_0$ and $a_1$ from another electronic device, may transmit the cipher texts $c_0$ and $c_1$ to another electronic device, or may receive the cipher texts $c_0$ and $c_1$ from another electronic device.

Figure 10:
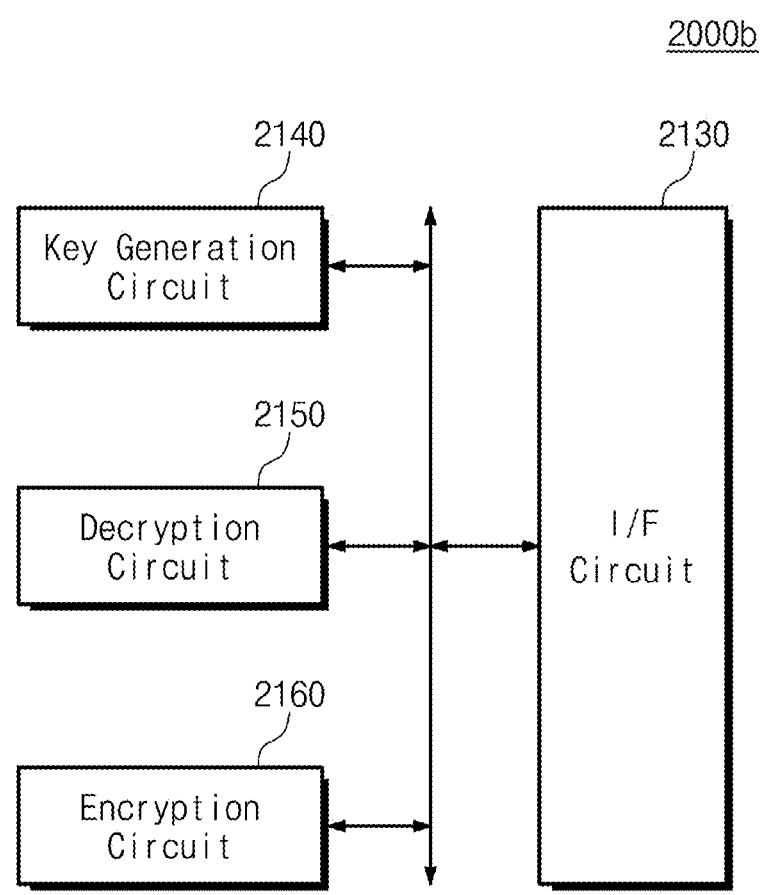
FIG. 10 is a block diagram illustrating an encryption/decryption device according to some example embodiments of the inventive concepts.

FIG. 10 is a block diagram illustrating an encryption/decryption device according to some example embodiments of the inventive concepts.

Referring to FIG. 10, an encryption/decryption device 2000*b* may include the interface circuit 2130, a key generation circuit 2140, a decryption circuit 2150, and an encryption circuit 2160, which communicate with one another through an internal bus. The interface circuit 2130 may be the same or substantially the same as the interface circuit 2130 of FIG. 9. The key generation circuit 2140 may be the same or substantially the same as the key generation circuit 1140 of FIG. 5. The decryption circuit 2150 may be the same or substantially the same as the decryption circuit 1150 of FIG. 5. The encryption circuit 2160 may be the same or substantially the same as the encryption circuit 1240 of FIG. 5.

Figure 11:
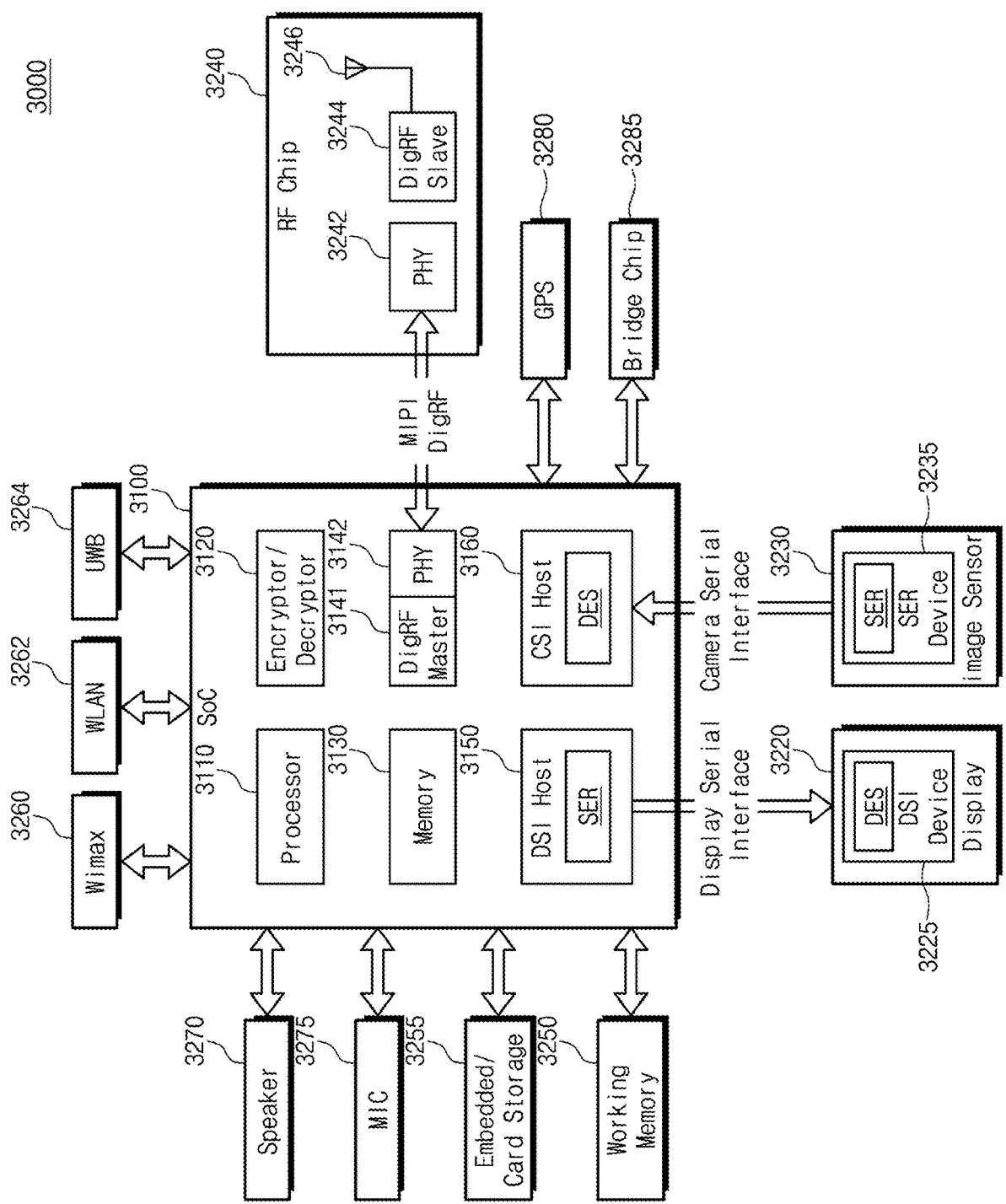
FIG. 11 is a block diagram illustrating an electronic device according to some example embodiments of the inventive concepts.

FIG. 11 is a block diagram illustrating an electronic device according to some example embodiments of the inventive concepts.

Referring to FIG. 11, an electronic device 3000 may be an example implementation of each of the decryption devices 1100, 1100*a*, and 1100*b*, the encryption devices 1200, 1200*a*, and 1200*b*, or the encryption/decryption devices 2000*a* and 2000*b* described above with reference to FIGS. 1 to 10.

The electronic device 3000 may also be referred to as a computing system, a memory system, an electronic system, a communication system, etc. . . . For example, the electronic device 3000 may be a desktop computer, a laptop computer, a tablet computer, a mobile device, a smartphone, a personal digital assistant (PDA), a portable media player (PMP), a wearable device, a video game console, a workstation, a server, a data processing device that may use or support interface protocols proposed by the MIPI Alliance (Mobile Industry Processor Interface Alliance), a home appliance, a black box, a drone, an internet of things (IoT) device, a smart card, a security device, etc. The electronic device 3000 may include a system on chip 3100. The system on chip 3100 may include a processor 3110, an encryptor/decryptor 3120, and a memory 3130. The processor 3110 may be an example of one of the aforementioned processors 1110, 1210, and 2110. The encryptor/decryptor 3120 may include at least some or all of the key generation circuits 1140 and 2140, the decryption circuits 1150 and 2150, and the encryption circuits 1240 and 2160. As described above, when the RLWE encryption algorithm is implemented in a combination of hardware and software manners, the system on chip 3100 may not include the encryptor/decryptor 3120. The memory 3130 may be an example of one of the aforementioned memories 1120, 1220, and 2120.

The electronic device 3000 may include a display 3220 and an image sensor 3230. The system on chip 3100 may further include a DigRF master 3141, a display serial interface (DSI) host 3150, a camera serial interface (CSI) host 3160, and a physical layer 3142. The DSI host 3150 may communicate with the DSI device 3225 of the display 3220, based on the DSI. A serializer SER may be implemented in the DSI host 3150, and a deserializer DES may be implemented in a DSI device 3225. The CSI host 3160 may communicate with a CSI device 3235 of the image sensor 3230, based on the CSI. A deserializer (DES) may be implemented in the CSI host 3160, and a serializer SER may be implemented in the CSI device 3235. The electronic device 3000 may further include a radio frequency (RF) chip 3240 that communicate with the system on chip 3100. The RF chip 3240 may include a physical layer 3242, a DigRF slave 3244, and an antenna 3246. For example, the physical layer 3242 and the physical layer 3142 may exchange data with each other, based on a DigRF interface proposed by a MIPI association. The electronic device 3000 may further include a working memory 3250 and an embedded/card storage device 3255. The working memory 3250 and the embedded/card storage device 3255 may store or output data related to the system on chip 3100. The embedded storage device 3255 may be embedded in the electronic device 3000, and the card storage device 3255 may be mounted on the electronic device 3000 as a removable device. The electronic device 3000 may communicate with an external device/system through a communication module such as Wimax (World Interoperability for Microwave Access, 3260), WLAN (Wireless Local Area Network, 3262), UWB (Ultra-Wideband, 3264), etc. The electronic device 3000 may further include a speaker 3270, a microphone 3275, a global positioning system (GPS) device 3280, and a bridge chip 3285.

Figure 12:
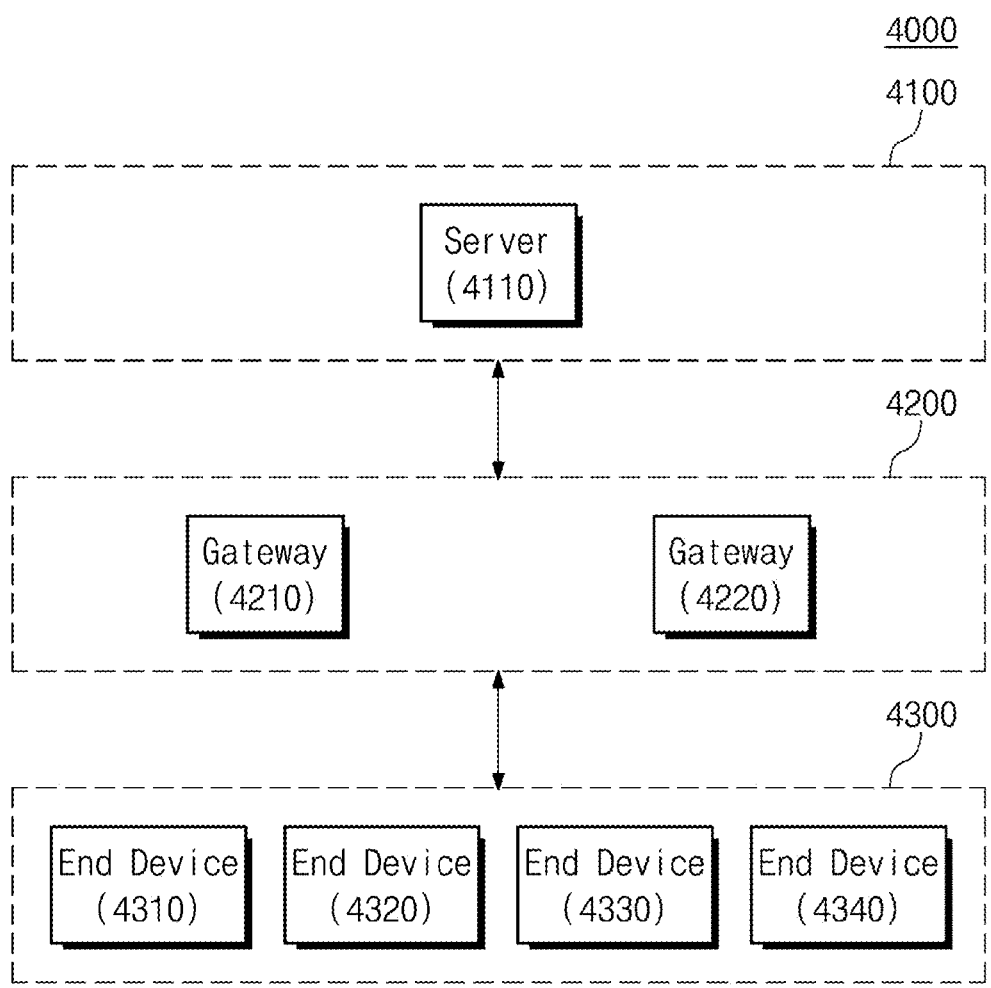
FIG. 12 is a block diagram illustrating a communication system according to some example embodiments of the inventive concepts.

FIG. 12 is a block diagram illustrating a communication system according to some example embodiments of the inventive concepts.

Referring to FIGS. 1 and 12, the communication system 1000 described above with reference to FIG. 1 may correspond to a part of a communication system 4000. The communication system 4000 may correspond to an example of an IoT communication system or a machine to machine (M2M) communication system. The communication system 4000 may include an application layer 4100, a network layer 4200, and a perception layer 4300. The perception layer 4300 may include end devices 4310 to 4340.

For example, the end devices 4310 to 4340 may include a sensor, an actuator, etc. that interact with the surrounding environment of the communication system 4000. The network layer 4200 may include gateways 4210 and 4220, may search, find, and connect the end devices 4310 to 4340 of the perception layer 4300 through a network in coordinate with the application layer 4100. The gateways 4210 and 4220 may transmit data between the end devices 4310 to 4340 and a server 4110 bidirectionally. The application layer 4100 may include the server 4110 (or a cloud device) equipped with services and functions for a user. For example, the server 4110 may collect, manage, or analyze data of the end devices 4310 to 4340 through the gateways 4210 and 4220, and may control the gateways 4210 and 4220 and the end devices 4310 to 4340. The components 4110, 4210 to 4220, and 4310 to 4340 are not limited to the numbers illustrated in FIG. 12 and may communicate with one another through various wired or wireless network manners. For example, each of the components 4110, 4210 to 4220, and 4310 to 4340 may be one of the components 1100, 1100a, 1100b, 1200, 1200a, 1200b, 2000a, 2000b, and 3000 described above in FIGS. 1 to 11

According to some example embodiments of the inventive concepts, since a decryption device of a communication system decides a coefficient of a transmission message w calculated from cipher texts $c_0$ and $c_1$ that are transmitted from an encryption device, and decrypts a modified transmission message $\psi'$ having a coefficient decided instead of the transmission message w, the problem that sizes of errors u, g, and h used in the encryption device are limited due to the decryption error of the transmission message $\psi$ may be addressed.

The components of the communication systems discussed above including the discrete decryption device and the encryption device of, for example, FIGS. 4 and 5, or the combined encryption/decryption devices of, for example, FIGS. 9 and 10 may be implemented in processing circuitry such as hardware including analog circuit(s), digital circuit(s), and/or logic circuit(s) as illustrated in FIGS. 5-8 and 10, a hardware/software combination such as a processor executing software as illustrated in FIGS. 4 and 9; or a combination thereof.

For example, the processing circuitry may include, but is not limited to, a central processing unit (CPU), an arithmetic logic unit (ALU), a digital signal processor, a microcomputer, a field programmable gate array (FPGA), a programmable logic unit, a microprocessor, an application-specific integrated circuit (ASIC), etc.

The processing circuitry may be special purpose processing circuitry that calculate a decryption message m" that is identical to a plain text message m regardless of the sizes of the errors u, g, and h by generating a modified transmission message $\psi'$ from a transmission message $\psi$ such that the modified transmission message $\psi'$ is an n−1th order integer polynomial and has coefficients less than the prime number q. Therefore, the special purpose processing circuitry may improve the functioning of the communication systems themselves by addressing the problem in which sizes of the errors u, g, and h used in the encryption device are limited due to a decryption error of the transmission message $\psi$.

The contents described above are some example embodiments for implementing the inventive concepts. The inventive concepts may include not only the example embodiments described above but also example embodiments in which a design is simply or easily capable of being changed. In addition, the inventive concepts may also include technologies easily changed to be implemented in the future using example embodiments.

What is claimed is:

1. A non-transitory computer readable medium storing program code that, when is executed by a processor, causes the processor to:
   calculate a message, based on a first cipher text, a second cipher text, and a private key;
   compare coefficients of the message with a reference value to generate a comparison result, the reference value being based on a prime number;
   generate, based on the message, a modified message by selectively modifying a respective one of the coefficients of the message, in response to the comparison result indicating that the respective one of the coefficients of the message is greater than the reference value; and
   decrypt the modified message.

2. The non-transitory computer readable medium of claim 1, wherein the program code, when executed, causes the processor to generate the modified message by,
   maintaining the respective one of the coefficients of the message, in response to the respective one of the coefficients of the message being less than the reference value.

3. The non-transitory computer readable medium of claim 1, wherein the program code, when executed, causes the processor to selectively modify the coefficients of the message by,
   setting the respective one of the coefficients in the modified message to a first value, in response to the respective one of the coefficients of the message being greater than the reference value and the respective one of the coefficients of the message is even, and
   setting the respective one of the coefficients in the modified message to a second value, in response to the respective one of the coefficients of the message being greater than the reference value and the respective one of the coefficients of the message is odd.

4. The non-transitory computer readable medium of claim 1, wherein the program code, when executed, causes the processor to calculate the reference value by a division operation on the prime number and one of a round operation, a floor operation, and a ceil operation on a result of the division operation of divisor 2.

5. The non-transitory computer readable medium of claim 1, wherein the program code, when executed, causes the processor to calculate the message by,
   executing a multiplication operation on the second cipher text and the private key to generate a multiplication result; and executing an addition operation on the multiplication result and the first cipher text.

6. The non-transitory computer readable medium of claim 1, wherein the program code, when executed, causes the processor to decrypt the modified message by executing a modulo operation on the modified message.

7. The non-transitory computer readable medium of claim 6, wherein a divisor of the modulo operation is "2".

8. A decryption device comprising:
processing circuitry configured to,
calculate a message based on a first cipher text, a second cipher text, and a private key,
compare coefficients of the message with a reference value to generate a comparison result, the reference value being based on a prime number,
generate, based on the message, a modified message by selectively modifying a respective one of the coefficients, in response to the comparison result indicating that the respective one of the coefficients of the message is greater than the reference value, and
decrypt the modified message.

9. The decryption device of claim 8, wherein the processing circuitry is configured to generate the modified message by,
maintaining the respective one of the coefficients of the message, in response to the respective one of the coefficients of the message being less than the reference value.

10. The decryption device of claim 8, wherein the processing circuitry is configured to selectively modify the coefficients of the message by,
setting the respective one of the coefficients in the modified message to a first value, in response to the respective one of the coefficients of the message being greater than the reference value and the respective one of the coefficients of the message is even, and
setting the respective one of the coefficients in the modified message to a second value, in response to the respective one of the coefficients of the message being greater than the reference value and the respective one of the coefficients of the message is odd.

11. The decryption device of claim 8, wherein the processing circuitry is configured to calculate the reference value by a division operation on the prime number and one of a round operation, a floor operation, and a ceil operation on a result of the division operation of divisor "2".

12. The decryption device of claim 8, wherein the processing circuitry is configured to calculate the message by,
executing a multiplication operation on the second cipher text and the private key to generate a multiplication result; and
executing an addition operation on the multiplication result and the first cipher text.

13. The decryption device of claim 8, wherein the processing circuitry is configured to decrypt the modified message by executing a modulo operation on the modified message.

14. The decryption device of claim 13, wherein a divisor of the modulo operation is "2".

15. A communication system comprising:
an encryption device including processing circuitry configured to,
calculate a first cipher text based on a first public key, and
calculate a second cipher text based on a second public key and a plain text message; and a decryption device including processing circuitry configured to,
determine a private key by sampling a first normal distribution,
determine the first public key by sampling a polynomial ring,
calculate the second public key based on the private key and the first public key,
receive the first cipher text and the second cipher text from the encryption device in response to transmitting the first public key and the second public key thereto,
generate a transmission message based on the first cipher text, the second cipher text, and the private key,
compare coefficients of the transmission message with a reference value to generate a comparison result, the reference value being based on a prime number,
generate, based on the transmission message, a modified transmission message by selectively modifying a respective one of the coefficients of the transmission message, in response to the comparison result indicating that the respective one of the coefficients of the message is greater than the reference value, and
decrypt the modified transmission message.

16. The communication system of claim 15, wherein the decryption device is configured to generate the modified transmission message by,
setting the respective one of the coefficients in the modified transmission message to a first value, in response to the respective one of the coefficients of the transmission message being greater than the reference value and the respective one of the coefficients of the transmission message is even,
setting the respective one of the coefficients in the modified transmission message to a second value, in response to the respective one of the coefficients of the transmission message being greater than the reference value and the respective one of the coefficients of the transmission message is odd, and
maintaining the respective one of the coefficients of the transmission message, in response to the respective one of the coefficients of the transmission message being less than the reference value.

17. The communication system of claim 15, wherein the decryption device is further configured to calculate the second public key, by executing a first multiplication operation on the private key and the first public key, and executing a first addition operation on a result of the first multiplication operation and a first error sampled from the first normal distribution.

18. The communication system of claim 17, wherein the encryption device is further configured to:
calculate the first cipher text by executing a second multiplication operation on the first public key and a second error sampled from a second normal distribution, executing a third multiplication operation on a third error sampled from the second normal distribution and a parameter, and executing a second addition operation on multiplication results of the second and third multiplication operations; and
calculate the second cipher text by executing a fourth multiplication operation on the second public key and the second error, executing a fifth multiplication operation on a fourth error sampled from the second normal distribution and the parameter, and executing a third addition operation on multiplication results of the fourth and fifth multiplication operations and the plain text message.

19. The communication system of claim 18, wherein the decryption device is further configured to calculate the transmission message by executing a sixth multiplication operation on the first cipher text and the private key, and executing a fourth addition operation on a multiplication result of the sixth multiplication operation and the second cipher text.

20. The communication system of claim 15, wherein the decryption device is configured to restore the plain text message by executing a modulo operation on the modified transmission message.

* * * * *